(12) United States Patent
Nakano et al.

(10) Patent No.: US 8,673,994 B2
(45) Date of Patent: Mar. 18, 2014

(54) INK COMPOSITION, TWO-PACK CURING INK COMPOSITION SET, AND RECORDING METHOD AND RECORDED MATTER USING THESE

(75) Inventors: Keitaro Nakano, Nagano-ken (JP); Takashi Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/197,174

(22) Filed: Aug. 3, 2011

(65) Prior Publication Data

US 2011/0287236 A1 Nov. 24, 2011

Related U.S. Application Data

(63) Continuation of application No. 11/998,469, filed on Nov. 29, 2007, now abandoned.

(30) Foreign Application Priority Data

Nov. 30, 2006 (JP) ................................. 2006-323892
Aug. 30, 2007 (JP) ................................. 2007-223824

(51) Int. Cl.
*C08F 2/50* (2006.01)
*C08J 3/28* (2006.01)
*C09D 11/08* (2006.01)
*C09D 11/00* (2006.01)

(52) U.S. Cl.
USPC .................. 522/96; 522/71; 522/74; 522/75; 522/78; 522/90; 522/81; 522/113; 522/114; 522/116; 522/120; 522/150; 522/151; 522/152; 522/173; 522/174; 106/31.13; 106/31.6; 106/31.3; 523/160

(58) Field of Classification Search
USPC .............. 522/71, 74, 75, 78, 81, 90, 96, 113, 522/114, 116, 120, 150, 151, 152, 173, 522/174; 106/31.13, 31.6, 31.3; 523/160
See application file for complete search history.

(56) References Cited

U.S. PATENT DOCUMENTS

| | | | |
|---|---|---|---|
| 3,582,487 A | 6/1971 | Fuhr et al. | |
| 3,607,693 A | 9/1971 | Heine et al. | |
| 3,720,635 A | 3/1973 | Metzner et al. | |
| 3,929,693 A | 12/1975 | Hochberg | |
| 4,007,144 A | 2/1977 | Sanders et al. | |
| 4,129,486 A | 12/1978 | Deutsch et al. | |
| 4,133,793 A | 1/1979 | Lewis et al. | |
| 4,190,602 A | 2/1980 | Brunisholz et al. | |
| 4,233,195 A | 11/1980 | Mills | |
| 4,239,866 A | 12/1980 | Reitel et al. | |
| 4,239,966 A | 12/1980 | Wang | |
| 4,308,400 A | 12/1981 | Felder et al. | |
| 4,315,807 A | 2/1982 | Felder et al. | |
| 4,318,791 A | 3/1982 | Felder et al. | |
| 4,320,186 A | 3/1982 | Kato et al. | |
| 4,321,118 A | 3/1982 | Felder et al. | |
| 4,347,111 A | 8/1982 | Gehlhaus et al. | |
| 4,370,379 A | 1/1983 | Kato et al. | |
| 4,450,279 A | 5/1984 | Shirosaki et al. | |
| 4,477,681 A | 10/1984 | Gehlhaus et al. | |
| 4,507,466 A | 3/1985 | Tomalia et al. | |
| 4,522,693 A | 6/1985 | Henne et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,631,337 A | 12/1986 | Tomalia et al. | |
| 4,694,064 A | 9/1987 | Tomalia et al. | |
| 4,721,734 A | 1/1988 | Gehlhaus et al. | |
| 4,830,902 A | 5/1989 | Plantenga et al. | |
| 4,922,004 A | 5/1990 | Kohler et al. | |
| 5,041,516 A | 8/1991 | Frechet et al. | |
| 5,077,402 A | 12/1991 | Desobry et al. | |
| 5,212,212 A * | 5/1993 | Fonda ............................. 522/79 |
| 5,221,334 A | 6/1993 | Ma et al. | |
| 5,281,682 A | 1/1994 | Cornforth et al. | |
| 5,453,121 A | 9/1995 | Nicholls et al. | |
| 5,609,671 A | 3/1997 | Nagasawa | |
| 5,623,001 A | 4/1997 | Figov | |
| 5,662,736 A | 9/1997 | Sakai et al. | |
| 5,662,738 A | 9/1997 | Schmid et al. | |

(Continued)

FOREIGN PATENT DOCUMENTS

CN 1086637 C 6/2002
CN 1398724 A 2/2003

(Continued)

OTHER PUBLICATIONS

Laromer UA 9029 V, Technical Information Sheet, (Dec. 2003). online. [retrived online Aug. 15, 2012]. Retrieved from Internet<URL/http://www2.basf.us/rawmaterials/pdfs/UA9029V.pdf>.*

(Continued)

*Primary Examiner* — Sanza McClendon

(57) ABSTRACT

The present invention provides: an ink composition which contains at least a polymerizable compound, a photopolymerization initiator and a coloring material, and is free from an aqueous solvent, wherein the polymerizable compound comprises at least a urethane oligomer; a two-pack curing ink composition set comprising an ink composition containing a coloring material and a reaction liquid containing a photopolymerization initiator and capable of forming an image with an ink composition obtained by mixing the ink composition and the reaction liquid, wherein the ink composition after mixing contains at least a polymerizable compound, a photopolymerization initiator and a coloring material, and is free from an aqueous solvent, wherein the polymerizable compound comprises a urethane oligomer.

17 Claims, No Drawings

(56) References Cited

U.S. PATENT DOCUMENTS

| | | | |
|---|---|---|---|
| 5,690,723 A | 11/1997 | Sano et al. | |
| 5,846,306 A | 12/1998 | Kubota et al. | |
| 5,903,290 A | 5/1999 | Nicoloff, Jr. et al. | |
| 5,928,419 A | 7/1999 | Uemura et al. | |
| 5,952,401 A | 9/1999 | Kimura et al. | |
| 5,958,121 A | 9/1999 | Lin | |
| 5,976,233 A | 11/1999 | Osumi et al. | |
| 6,030,441 A | 2/2000 | Kubota et al. | |
| 6,087,416 A | 7/2000 | Pearlstine et al. | |
| 6,114,404 A * | 9/2000 | Deeken et al. | 522/88 |
| 6,117,606 A | 9/2000 | Macholdt et al. | |
| 6,123,759 A | 9/2000 | Mise et al. | |
| 6,136,286 A | 10/2000 | Okuyama et al. | |
| 6,179,415 B1 | 1/2001 | Okazaki et al. | |
| 6,187,897 B1 | 2/2001 | Kawashima et al. | |
| 6,300,388 B1 | 10/2001 | Verdonck et al. | |
| 6,322,188 B1 | 11/2001 | Sano | |
| 6,331,111 B1 | 12/2001 | Cao | |
| 6,332,291 B1 | 12/2001 | Flosbach et al. | |
| 6,341,841 B1 | 1/2002 | Shimada et al. | |
| 6,395,079 B1 | 5/2002 | Sano | |
| 6,419,733 B1 | 7/2002 | Sano et al. | |
| 6,428,662 B1 | 8/2002 | Woodruff et al. | |
| 6,433,038 B1 | 8/2002 | Tanabe et al. | |
| 6,444,019 B1 | 9/2002 | Zou et al. | |
| 6,488,751 B1 | 12/2002 | Takemoto | |
| 6,491,748 B2 | 12/2002 | Watanabe | |
| 6,518,370 B2 | 2/2003 | Abuelyaman et al. | |
| 6,558,460 B1 | 5/2003 | Walker et al. | |
| 6,558,753 B1 | 5/2003 | Ylitalo et al. | |
| 6,602,333 B2 | 8/2003 | Miyabayashi | |
| 6,637,850 B2 | 10/2003 | Shimada et al. | |
| 6,653,367 B2 | 11/2003 | Miyabayashi | |
| 6,654,367 B1 | 11/2003 | Kaufman | |
| 6,664,306 B2 | 12/2003 | Gaddam et al. | |
| 6,726,756 B1 | 4/2004 | Zou et al. | |
| 6,793,313 B1 | 9/2004 | Adachi et al. | |
| 6,793,318 B2 | 9/2004 | Saksa | |
| 6,846,074 B2 | 1/2005 | Hirai | |
| 6,846,851 B2 | 1/2005 | Nakhmanovich et al. | |
| 6,849,110 B2 | 2/2005 | Sano | |
| 6,869,470 B2 | 3/2005 | Kato | |
| 6,877,851 B2 | 4/2005 | Watanabe | |
| 6,890,049 B2 | 5/2005 | Shimada et al. | |
| 6,924,327 B2 | 8/2005 | Sano et al. | |
| 6,989,054 B2 | 1/2006 | Tanabe et al. | |
| 7,008,475 B2 | 3/2006 | Randler et al. | |
| 7,025,449 B2 | 4/2006 | Simons et al. | |
| 7,040,747 B2 | 5/2006 | Kubota et al. | |
| 7,064,153 B2 | 6/2006 | Bruck | |
| 7,156,909 B2 | 1/2007 | Oyanagi et al. | |
| 7,259,100 B2 | 8/2007 | Zurcher et al. | |
| 7,285,592 B2 | 10/2007 | Harz et al. | |
| 7,296,883 B2 | 11/2007 | Kanaya et al. | |
| 7,303,619 B2 | 12/2007 | Oyanagi | |
| 7,348,128 B2 | 3/2008 | Yamada et al. | |
| 7,384,472 B2 | 6/2008 | Schweikart et al. | |
| 7,419,255 B2 | 9/2008 | Kawaguchi et al. | |
| 7,438,405 B2 | 10/2008 | Ichizawa et al. | |
| 7,513,945 B2 | 4/2009 | Nakano et al. | |
| 7,538,144 B2 | 5/2009 | Vanmaele et al. | |
| 7,591,889 B2 | 9/2009 | Stoffel et al. | |
| 7,604,693 B2 | 10/2009 | Oyanagi et al. | |
| 7,619,015 B2 | 11/2009 | Oyanagi et al. | |
| 7,670,418 B2 | 3/2010 | Kato et al. | |
| 7,732,505 B2 | 6/2010 | Kito et al. | |
| 7,753,514 B2 | 7/2010 | Nakano et al. | |
| 7,790,245 B2 | 9/2010 | Oyanagi et al. | |
| 7,850,280 B2 | 12/2010 | Oyanagi et al. | |
| 7,854,798 B2 | 12/2010 | Udagawa et al. | |
| 7,855,041 B2 | 12/2010 | Weber et al. | |
| 7,866,807 B2 | 1/2011 | Makuta et al. | |
| 7,893,127 B2 * | 2/2011 | Nagvekar et al. | 522/120 |
| 7,968,621 B2 | 6/2011 | Oyanagi et al. | |
| 8,044,116 B2 | 10/2011 | Idemura et al. | |
| 2003/0003296 A1 | 1/2003 | Dries et al. | |
| 2003/0017353 A1 | 1/2003 | Yamaguchi et al. | |
| 2003/0050379 A1 | 3/2003 | Shih et al. | |
| 2003/0089271 A1 | 5/2003 | Hirano et al. | |
| 2003/0144377 A1 | 7/2003 | Sano et al. | |
| 2003/0153649 A1 | 8/2003 | Bromberg | |
| 2003/0157356 A1 | 8/2003 | Tamura et al. | |
| 2003/0176566 A1 | 9/2003 | Wight et al. | |
| 2003/0222959 A1 | 12/2003 | Yamanouchi et al. | |
| 2003/0231234 A1 | 12/2003 | Ushirogouchi et al. | |
| 2004/0021753 A1 | 2/2004 | Yoshihiro et al. | |
| 2004/0069183 A1 | 4/2004 | Kamoto et al. | |
| 2004/0257419 A1 | 12/2004 | Iinuma et al. | |
| 2004/0266907 A1 | 12/2004 | Sugita et al. | |
| 2005/0039631 A1 | 2/2005 | Best et al. | |
| 2005/0158524 A1 | 7/2005 | Sloat et al. | |
| 2005/0159501 A1 | 7/2005 | Kiefer-Liptak | |
| 2005/0176841 A1 * | 8/2005 | Krohn | 522/81 |
| 2005/0176847 A1 | 8/2005 | Cagle | |
| 2005/0197418 A1 | 9/2005 | Graziano et al. | |
| 2005/0197419 A1 | 9/2005 | Graziano et al. | |
| 2005/0282930 A1 | 12/2005 | Fu et al. | |
| 2006/0009546 A1 | 1/2006 | Brown | |
| 2006/0014849 A1 | 1/2006 | Vanmaele et al. | |
| 2006/0014850 A1 | 1/2006 | Vanmaele et al. | |
| 2006/0036001 A1 | 2/2006 | Oyanagi et al. | |
| 2006/0078695 A1 | 4/2006 | Sen et al. | |
| 2006/0092254 A1 | 5/2006 | Claes et al. | |
| 2006/0158493 A1 | 7/2006 | Nakano et al. | |
| 2006/0160917 A1 | 7/2006 | Oyanagi et al. | |
| 2006/0189712 A1 | 8/2006 | Kondo | |
| 2006/0211788 A1 | 9/2006 | Krohn | |
| 2006/0229382 A1 | 10/2006 | Schweikart et al. | |
| 2006/0268084 A1 | 11/2006 | Nishizaki et al. | |
| 2007/0022547 A1 | 2/2007 | O'Brien | |
| 2007/0031615 A1 | 2/2007 | Nair et al. | |
| 2007/0037961 A1 | 2/2007 | Oyanagi et al. | |
| 2007/0044684 A1 | 3/2007 | Nakano et al. | |
| 2007/0046720 A1 | 3/2007 | Konno et al. | |
| 2007/0060670 A1 | 3/2007 | Ellis | |
| 2007/0076069 A1 | 4/2007 | Edwards et al. | |
| 2007/0120926 A1 | 5/2007 | Doumaux et al. | |
| 2007/0129457 A1 | 6/2007 | Nakano et al. | |
| 2007/0142501 A1 | 6/2007 | Oyanagi et al. | |
| 2007/0148585 A1 | 6/2007 | Kaneko et al. | |
| 2007/0222811 A1 | 9/2007 | Yanagi | |
| 2007/0224345 A1 | 9/2007 | Metz et al. | |
| 2007/0249750 A1 | 10/2007 | Oyanagi et al. | |
| 2007/0281141 A1 | 12/2007 | Kohlweyer | |
| 2008/0022893 A1 | 1/2008 | Mizutani | |
| 2008/0024577 A1 | 1/2008 | Nakano et al. | |
| 2008/0028980 A1 | 2/2008 | Aoki et al. | |
| 2008/0090931 A1 | 4/2008 | Nagvekar et al. | |
| 2008/0096998 A1 | 4/2008 | Oyanagi et al. | |
| 2008/0098928 A1 | 5/2008 | Oyanagi et al. | |
| 2008/0125511 A1 | 5/2008 | Nakano et al. | |
| 2008/0132599 A1 | 6/2008 | Nakano et al. | |
| 2008/0145628 A1 | 6/2008 | Oyanagi et al. | |
| 2008/0146689 A1 * | 6/2008 | Oyanagi et al. | 522/39 |
| 2008/0152825 A1 | 6/2008 | Mukai et al. | |
| 2008/0152828 A1 | 6/2008 | Mukai et al. | |
| 2008/0152877 A1 | 6/2008 | Mukai et al. | |
| 2008/0173214 A1 | 7/2008 | Oyanagi et al. | |
| 2008/0182083 A1 | 7/2008 | Oyanagi et al. | |
| 2008/0182085 A1 | 7/2008 | Oyanagi et al. | |
| 2008/0207805 A1 | 8/2008 | Blease et al. | |
| 2008/0213518 A1 | 9/2008 | Oyanagi et al. | |
| 2008/0233362 A1 | 9/2008 | Kato et al. | |
| 2008/0250970 A1 | 10/2008 | Oyanagi et al. | |
| 2008/0308004 A1 | 12/2008 | Deroover et al. | |
| 2009/0053415 A1 | 2/2009 | Isobe | |
| 2009/0075036 A1 | 3/2009 | Itano et al. | |
| 2009/0099277 A1 * | 4/2009 | Nagvekar et al. | 522/153 |
| 2009/0110827 A1 | 4/2009 | Nakano et al. | |
| 2009/0142555 A1 | 6/2009 | Sano et al. | |
| 2009/0169834 A1 | 7/2009 | Sano et al. | |
| 2009/0208651 A1 | 8/2009 | Oyanagi et al. | |
| 2009/0214833 A1 | 8/2009 | Oyanagi et al. | |
| 2009/0220695 A1 | 9/2009 | Oyanagi et al. | |

(56) References Cited

U.S. PATENT DOCUMENTS

| | | |
|---|---|---|
| 2009/0233064 A1 | 9/2009 | Yatake et al. |
| 2009/0246479 A1 | 10/2009 | Mukai et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1 | 4/2010 | Mukai et al. |
| 2010/0092674 A1 | 4/2010 | Mukai et al. |
| 2010/0092675 A1 | 4/2010 | Aoki |
| 2011/0014440 A1 | 1/2011 | Itano et al. |
| 2011/0036266 A1 | 2/2011 | Oyanagi et al. |
| 2011/0183124 A1 | 7/2011 | Aoki et al. |
| 2011/0183125 A1 | 7/2011 | Aoki et al. |
| 2012/0006224 A1 | 1/2012 | Oyanagi et al. |

FOREIGN PATENT DOCUMENTS

| | | |
|---|---|---|
| CN | 1721462 A | 1/2006 |
| CN | 1771307 A | 5/2006 |
| DE | 10 2005021160 A1 | 11/2006 |
| EP | 0 284 561 A2 | 9/1988 |
| EP | 0 333 224 A2 | 9/1989 |
| EP | 0 352 821 A1 | 1/1990 |
| EP | 0 372 778 A1 | 6/1990 |
| EP | 0 894 835 A2 | 2/1999 |
| EP | 0 997 507 A1 | 5/2000 |
| EP | 1 045 013 A1 | 10/2000 |
| EP | 1 260 563 A1 | 11/2002 |
| EP | 1 295 916 A1 | 3/2003 |
| EP | 1 422 072 A1 | 5/2004 |
| EP | 1 452 569 A1 | 9/2004 |
| EP | 1 614 730 A1 | 1/2006 |
| EP | 1 616 920 A1 | 1/2006 |
| EP | 1 616 921 A1 | 1/2006 |
| EP | 1 674 499 A1 | 6/2006 |
| EP | 1 752 504 A1 | 2/2007 |
| EP | 1 806 387 A1 | 7/2007 |
| EP | 1 815 978 A1 | 8/2007 |
| EP | 1 837 381 A1 | 9/2007 |
| EP | 1 892 105 A1 | 2/2008 |
| EP | 1 942 157 A2 | 7/2008 |
| EP | 1 942 158 A2 | 7/2008 |
| GB | 1 276 369 | 6/1972 |
| GB | 1 547 283 | 6/1979 |
| GB | 2029433 | 3/1980 |
| GB | 2 172 655 A | 9/1986 |
| GB | 2 367 299 A | 4/2002 |
| JP | 47-3981 B | 2/1972 |
| JP | 47-6416 B | 2/1972 |
| JP | 47-22326 | 6/1972 |
| JP | 47-23664 | 7/1972 |
| JP | 56-028256 A | 3/1981 |
| JP | 57-30704 A | 2/1982 |
| JP | 59-42864 B2 | 10/1984 |
| JP | 60-26403 B2 | 6/1985 |
| JP | 60-26483 B2 | 6/1985 |
| JP | 61-194062 A | 8/1986 |
| JP | 62-1426 A | 1/1987 |
| JP | 62-81345 A | 4/1987 |
| JP | 63-61950 B2 | 11/1988 |
| JP | 01-34242 B2 | 7/1989 |
| JP | 01-238656 A | 9/1989 |
| JP | 02-009596 B2 | 3/1990 |
| JP | 02-009597 | 3/1990 |
| JP | 2-211452 A | 8/1990 |
| JP | 3-56573 A | 3/1991 |
| JP | 3-79678 A | 4/1991 |
| JP | 3-160068 A | 7/1991 |
| JP | 03-216379 A | 9/1991 |
| JP | 4-18462 A | 1/1992 |
| JP | 05-186725 A | 7/1993 |
| JP | 07-258578 A | 10/1995 |
| JP | 08-003498 A | 1/1996 |
| JP | 08-218018 A | 8/1996 |
| JP | 08-283596 A | 10/1996 |
| JP | 08-295836 A | 11/1996 |
| JP | 10-110110 A | 4/1998 |
| JP | 10-110111 A | 4/1998 |
| JP | 10-110114 A | 4/1998 |
| JP | 10-120956 A | 5/1998 |
| JP | 10-120958 A | 5/1998 |
| JP | 10-195331 A | 7/1998 |
| JP | 10-195360 A | 7/1998 |
| JP | 10-237349 A | 9/1998 |
| JP | 10-287035 A | 10/1998 |
| JP | 10-330665 A | 12/1998 |
| JP | 11-011002 A | 1/1999 |
| JP | 11-165420 A | 6/1999 |
| JP | 11-193316 A | 7/1999 |
| JP | 11-202558 A | 7/1999 |
| JP | 11-343436 A | 12/1999 |
| JP | 2000-044858 A | 2/2000 |
| JP | 2000-044861 A | 2/2000 |
| JP | 2000-336295 A | 12/2000 |
| JP | 2000-345080 A | 12/2000 |
| JP | 2000-355667 A | 12/2000 |
| JP | 2001-348519 A | 12/2001 |
| JP | 2002-038063 A | 2/2002 |
| JP | 2002-179960 A | 6/2002 |
| JP | 2002-225414 A | 8/2002 |
| JP | 2002-249165 A | 9/2002 |
| JP | 2002-256189 A | 9/2002 |
| JP | 2002-529572 A | 9/2002 |
| JP | 2002-292775 A | 10/2002 |
| JP | 2002-332436 A | 11/2002 |
| JP | 2002-348513 A | 12/2002 |
| JP | 2003-012971 A | 1/2003 |
| JP | 2003-055463 A | 2/2003 |
| JP | 2003-055563 A | 2/2003 |
| JP | 2003-096337 A | 4/2003 |
| JP | 2003-147233 A | 5/2003 |
| JP | 2003-253148 A | 9/2003 |
| JP | 2003-292836 A | 10/2003 |
| JP | 2003-292857 A | 10/2003 |
| JP | 2003-306625 A | 10/2003 |
| JP | 2003-311945 A | 11/2003 |
| JP | 2003-342499 A | 12/2003 |
| JP | 2004-009359 A | 1/2004 |
| JP | 2004-009360 A | 1/2004 |
| JP | 2004-018716 A | 1/2004 |
| JP | 2004-059857 A | 2/2004 |
| JP | 2004-066817 A | 3/2004 |
| JP | 2004-099796 A | 4/2004 |
| JP | 2004-161852 A | 6/2004 |
| JP | 2004-174971 A | 6/2004 |
| JP | 2004-195797 A | 7/2004 |
| JP | 2004-197055 A | 7/2004 |
| JP | 2004-216654 A | 8/2004 |
| JP | 2004-250659 A | 9/2004 |
| JP | 2004-263139 A | 9/2004 |
| JP | 2004-264435 A | 9/2004 |
| JP | 2004-535506 A | 11/2004 |
| JP | 2004-535508 A | 11/2004 |
| JP | 2004-359960 A | 12/2004 |
| JP | 2005-007577 A | 1/2005 |
| JP | 2005-008690 A | 1/2005 |
| JP | 2005-015813 A | 1/2005 |
| JP | 2005-023284 A | 1/2005 |
| JP | 2005-023299 A | 1/2005 |
| JP | 2005-036079 A | 2/2005 |
| JP | 2005-060411 A | 3/2005 |
| JP | 2005-060419 A | 3/2005 |
| JP | 2005-068251 A | 3/2005 |
| JP | 2005-068252 A | 3/2005 |
| JP | 2005-068439 A | 3/2005 |
| JP | 2005-096254 A | 4/2005 |
| JP | 2005-161583 A | 6/2005 |
| JP | 2005-187659 A | 7/2005 |
| JP | 2005-220352 A | 8/2005 |
| JP | 2005-290362 A | 10/2005 |
| JP | 2005-298757 A | 10/2005 |
| JP | 2005-314655 A | 11/2005 |
| JP | 2005-350551 A | 12/2005 |

(56) References Cited

FOREIGN PATENT DOCUMENTS

| | | |
|---|---|---|
| JP | 2005-536375 A | 12/2005 |
| JP | 2006-070255 A | 3/2006 |
| JP | 2006-117795 A | 5/2006 |
| JP | 2006-117931 A | 5/2006 |
| JP | 2006-123529 A | 5/2006 |
| JP | 2006-123542 A | 5/2006 |
| JP | 2006-176734 A | 7/2006 |
| JP | 2006-199929 A | 8/2006 |
| JP | 2006-206875 A | 8/2006 |
| JP | 2006-241194 A | 9/2006 |
| JP | 2006-257302 A | 9/2006 |
| JP | 2006-257303 A | 9/2006 |
| JP | 2006-265524 A | 10/2006 |
| JP | 2006-272933 A | 10/2006 |
| JP | 2006-274025 A | 10/2006 |
| JP | 2006-274029 A | 10/2006 |
| JP | 2006-281538 A | 10/2006 |
| JP | 2006-281568 A | 10/2006 |
| JP | 2006-281570 A | 10/2006 |
| JP | 2006-282822 A | 10/2006 |
| JP | 2006-282823 A | 10/2006 |
| JP | 2006-283017 A | 10/2006 |
| JP | 2006-523762 A | 10/2006 |
| JP | 2006-312711 A | 11/2006 |
| JP | 2007-016103 A | 1/2007 |
| JP | 2007-023161 A | 2/2007 |
| JP | 2007-045989 A | 2/2007 |
| JP | 2007-046034 A | 2/2007 |
| JP | 2007-055084 A | 3/2007 |
| JP | 2007-100053 A | 4/2007 |
| JP | 2007-100054 A | 4/2007 |
| JP | 2007-112970 A | 5/2007 |
| JP | 2007-131741 A | 5/2007 |
| JP | 2007-138084 A | 6/2007 |
| JP | 2007-154087 A | 6/2007 |
| JP | 2007-169306 A | 7/2007 |
| JP | 2007-169307 A | 7/2007 |
| JP | 2007-169308 A | 7/2007 |
| JP | 2007-169451 A | 7/2007 |
| JP | 2007-191613 A | 8/2007 |
| JP | 2007-211036 A | 8/2007 |
| JP | 2007-254735 A | 10/2007 |
| JP | 2007-262272 A | 10/2007 |
| JP | 2007-269017 A | 10/2007 |
| JP | 2007-270085 A | 10/2007 |
| JP | 2007-297586 A | 11/2007 |
| JP | 2008-138045 A | 6/2008 |
| JP | 2008-155523 A | 7/2008 |
| JP | 2008-155524 A | 7/2008 |
| JP | 2009-113494 A | 5/2009 |
| JP | 2009-114454 A | 5/2009 |
| JP | 2009-242441 A | 10/2009 |
| JP | 2010-006062 A | 1/2010 |
| JP | 2010-090270 A | 4/2010 |
| JP | 2010-090271 A | 4/2010 |
| JP | 2010-094809 A | 4/2010 |
| JP | 2010-094852 A | 4/2010 |
| WO | 93/21235 | 10/1993 |
| WO | 99/05230 A1 | 2/1999 |
| WO | 00/52530 A1 | 9/2000 |
| WO | 01/08895 A1 | 2/2001 |
| WO | 02/38687 A1 | 5/2002 |
| WO | 02/076764 A2 | 10/2002 |
| WO | 2004/018197 A1 | 3/2004 |
| WO | 2004/031308 A1 | 4/2004 |
| WO | 2004/052947 A1 | 6/2004 |
| WO | 2004/094534 A1 | 11/2004 |
| WO | 2004/104051 A1 | 12/2004 |
| WO | 2005/047405 A1 | 5/2005 |
| WO | 2005/061566 A1 | 7/2005 |
| WO | 2005/089957 A1 | 9/2005 |
| WO | 2005/095006 A1 | 10/2005 |
| WO | 2006/041004 A1 | 4/2006 |
| WO | 2006/085992 A2 | 8/2006 |
| WO | 2006/087930 A1 | 8/2006 |
| WO | 2006/098676 A1 | 9/2006 |
| WO | 2006/112031 A1 | 10/2006 |
| WO | 2007/026355 A1 | 3/2007 |
| WO | 2007/026366 A1 | 3/2007 |
| WO | 2007/060264 A2 | 5/2007 |

OTHER PUBLICATIONS

IRGACURE 127 Photoinitiator. Technical Data Sheet from Ciba Specialty Chemicals. (2004). online. [retrieved online Aug. 15, 2012].. Retrieved from Internet<URL//http://www.xtgchem.cn/upload/20110629045402.PDF>.*

IRGACURE 127 Photoinitiator. Technical Data Sheet from Ciba Specialty Chemicals. (2004). online. [retrieved online Aug. 15, 2012].. Retrieved from Internet<URL/http://www.xtgchem.cn/upload/20110629045602.PDF>.*

EP Search Report for Application No. 11152226.4, dated May 11, 2011.

European Search Report dated Apr. 21, 2008, EP Application No. 07024545.1-2102.

BYK Additives & Instruments, Data Sheet S212, Issue 07/08, BYK-UV 3500 BYK-UV 3510 BYK-UV 3530 BYK-UV 3570, "Surface Additives for Radiation Curable Systems".

CIBA®, ®Ciba Specialty Chemicals Coating Effects, "Ciba® Darocur® EDB Photoinitiator", Edition Feb. 2, 2003.

CIBA®, ®Ciba Secialty Chemicals, "Ciba® IRGASTAB® UV 22", Coating Effects, 2006.

Final Office Action, U.S. Appl. No. 12/074,308 dated Jun. 8, 2012.

Office Action, CN Application No. 200910004654.0, dated Nov. 30, 2010, with English Translation.

Office Action, JP Application No. 2007-316368, dated Mar. 9, 2011, with English Translation.

Dispersion definition from Hawley's Condensed Chemical Dictionary.

Dispersion (chemistry) Wikipedia Definition, Wikipedia the free encyclopedia, Oct. 25, 2010.

Monroe, B., et al., "Photoinitiators for Free-Radical-Initiated Photoimaging Systems", American Chemical Society, Chemical Rev. 93, pp. 435-448, 1993.

Notice of Allowance, U.S. Appl. No. 12/228,224 dated Oct. 20, 2011.

Office Action, U.S. Appl. No. 12/228,224, dated Jun. 2, 2011.

Supplemental Notice of Allowance, U.S. Appl. No. 12/228,224, dated Jun. 28, 2012.

Step, E.N., et al., "Mechanism of Polymer Stabilization by Hindered-Amine Light Stabilizers (HALS). Model Investigations of the Interaction of Peroxy Radicals with HALS Amines and Amino Ethers", Macromolecules, American Chemical Society, 27, pp. 2529-2539, 1994.

Final Office Action, U.S. Appl. No. 12/894,423, dated May 29, 2012.

Office Action, JP2007-304874 dated May 25, 2011, English Translation.

Office Action, U.S. Appl. No. 12/394,336, dated Apr. 26, 2012.

European Search Report dated Nov. 2, 2011, Application No. 11177753.8.

Office Action, U.S. Appl. No. 12/894,423, dated Nov. 10, 2011.

Office Action, U.S. Appl. No. 13/240,667, dated Dec. 12, 2011.

Office Action, U.S. Appl. No. 12/228,193, dated Mar. 8, 2012.

CIBA,® Ciba Specialty Chemicals Inc., Coating Effects Segment, Ciba ® IRGACURE® 819, Photoinitiator, Edition Aug. 30, 2001.

CIBA® Ciba Specialty Chemicals Inc., Coating Effects Segment, IRGACURE® 127, Photoinitiator, Edition Apr. 9, 2004.

Hawker, C., et al., "Preparation of Polymers with Controlled Molecular Architecture. A New Convergent Approach to Dendritic Macromolecules", Journal of American Chemistry Society, 1990, 112, pp. 7638-7647.

Shiraj, M., et al., "Photoacid and Photobase Generators: Chemistry and Applications to Polymeric Materials", Prog. Polm. Sci., vol. 21, No. 1, 1996.

Office Action, U.S. Appl. No. 12/228,193 dated Jun. 2, 2011.

Davidson, R.S., "The chemistry of photoinitiators—some recent developments", J. Photochem: Photobiol., A: Chem, 73. pp. 81-96, 1993.

(56) References Cited

OTHER PUBLICATIONS

Fouassier, J.P., et al., Radiation Curing in Polymer Science and Technology, vol. 1, fundamentals and methods, pp. 76-117, 1993.
EP Search Report for Application No. 08016440.3, dated Dec. 29, 2008.
Search Report for PCT/JP2008/064126 dated Sep. 16, 2008.
The Japanese Research Association for Organic Electronics Materials for Imaging, Bunshin Publishing Co., pp. 187-192, 1993.
Saeva, F. D., et al., Topics in Current Chemistry 156, Photoinduced Electron Transfer (PET) Bond Cleavage Reactions, 1990.
Final Office Action, U.S. Appl. No. 12/228,193, dated Oct. 14, 2011.
Maslak, P., et al., Topics in Current Chemistry, 168, Fragmentations by Photoinduced Electron Transfer Fundamentals and Practical Aspects, 1993.

Chatterjee, S., et al., "Photochemistry of Carbocyanine Alkyltriphenylborate Salts: Intra-Ion-Pair Electron Transfer and the Chemistry of Boranyl Radicals", J. Am. Chem. Soc., 112, pp. 6329-6338, 1990.
Eaton, D., et al., "One-electron oxidation of benzyltrialkylstannanes. 1. Cation radical fragmentation by dual modes", J. Am. Chem. Soc., 1980, 102 (9), pp. 3278-3280 Publication Date: Apr. 1980.
Fouassier, J.P., "Photoinitiated Polymerisation—Theory and Applications", Rapra Review Report, vol. 9, No. 4, 1998.
Ciba® IRGACURE® 369 Photoinitiator, Ciba Specialty Chemicals Coating Effects Segment, Edition Apr. 9, 2001.
Kim, Y., "Highly Branched Aromatic Polymers Prepared by Single Step Syntheses", Macromol. Symp. pp. 21-33, 1994.
Hawker, C., et al., "Hyperbranched Poly(ethylene glycol)s: A New Class of Ion-Conducting Materials", Macromolecules, vol. 29, pp. 3831-3838, 1996.

* cited by examiner

INK COMPOSITION, TWO-PACK CURING INK COMPOSITION SET, AND RECORDING METHOD AND RECORDED MATTER USING THESE

CONTINUING APPLICATION DATA

This application is a continuation of, and claims priority under 35 U.S.C. §12 to, U.S. application Ser. No. 11/998,469, filed Nov. 29, 2007, the content of which is incorporated by reference herein in its entirety.

This application also claims priority under 35 U.S.C. §119, through the above-identified parent U.S. application, on Japanese patent application no. 2006-323892, filed on Nov. 30, 2006, and Japanese patent application no. 2007-223824, filed on Aug. 30, 2007. The content of each such related application is incorporated by reference herein in its entirety.

FIELD OF THE INVENTION

The present invention relates to an ink composition and a two-pack curing ink composition set, that cure by light such as ultraviolet rays. More particularly, it relates to an ink composition and a two-pack curing ink composition set, having excellent film strength and additionally excellent curability. Furthermore, the present invention relates to a recording method and recorded matter, using the ink composition or the two-pack curing ink composition set.

BACKGROUND OF THE INVENTION

Ink jet recording method is a printing method which conducts printing by flying small droplets of an ink composition and attaching the same to a recording medium such as papers. This ink jet recording method has the characteristic that high resolution and high definition image can be printed at high speed. In general, an ink composition used in an ink jet recording method comprises an aqueous solvent as a main component, and further contains a coloring component and a wetting agent such as glycerin for the purpose of preventing clogging.

On the other hand, where printing is conducted on recording media such as papers and clothes in which an aqueous ink composition is hard to penetrate, or materials such as metals and plastics, in which an aqueous ink composition does not penetrate, such as plates or films produced from phenol, melamine, vinyl chloride, acryl or polycarbonate, an ink composition is required to contain a component that a coloring material can stably be fixed to a recording medium.

To such a demand, a light curing ink jet ink comprising a coloring material, a light curing agent (racially polymerizable compound) and (photoradical) polymerization initiator is disclosed (for example, see Patent Document 1). It is described that this ink can prevent ink from bleeding into a recording medium, and can improve image quality.

Furthermore, to attempt improvement of film strength, chemical resistance, dispersion stability and the like, a light curing ink jet recording ink composition containing a coloring material, a urethane oligomer, a monomer having trifunctional or more reactive group, and an aqueous solvent is developed (see Patent Document 2).

Moreover, for the purpose of preventing separation of a pigment as a coloring material, improving scratch resistance and printing reliability, preventing bleeding after printing and enhancing drying properties of an ink, an ink jet recording ink comprising two components of an ink composition containing a coloring material, and a reaction liquid containing a polymerization initiator, and an ink jet recording method which prints on a recording medium using those two components are disclosed (for example, see Patent Document 3).

An ink jet recording ink comprising such two components is that a photopolymerization initiator and a light curing resin is contained in either of the ink composition or the reaction liquid. Thus, by separating into two components of the ink composition and the reaction liquid, dark reaction is suppressed, making it possible to store the ink composition and the reaction liquid over a long period of time and to obtain prints having excellent light resistance and heat resistance.

Patent Document 1: U.S. Pat. No. 5,623,001
Patent Document 2: JP-A-2000-336295
Patent Document 3: JP-A-8-218018

SUMMARY OF THE INVENTION

However, an ultraviolet curing ink composition using an aqueous solvent is that the aqueous medium does not contribute to curing. As a result, water bleeds upon curing, and due to the influence, a cured product does not have smooth edges, lacking in sharpness.

The present invention relates to an ink composition and a two-pack curing ink composition set, which overcome the disadvantages of the prior art, have excellent film strength, chemical resistance and dispersion stability and additionally excellent curability, and can form a clear image. Furthermore, the present invention relates to a recording method and recorded matter, using the ink composition and the two-pack curing ink composition set.

As a result that the present inventors have been made extensive and intensive investigations, the above objects are achieved by employing the following constitutions, and the present invention has been made.

That is, the present invention is as follows.

(1) An ink composition which contains at least a polymerizable compound, a photopolymerization initiator and a coloring material, and is free from an aqueous solvent, wherein the polymerizable compound comprises at least a urethane oligomer.

(2) The ink composition as described in (1), wherein the polymerizable compound is a radically polymerizable compound, and the photopolymerization initiator is a photoradical polymerization initiator.

(3) The ink composition as described in (1) or (2), wherein the content of the urethane oligomer in the ink composition is from 1 to 50% by weight.

(4) The ink composition as described in (2) or (3), wherein the radically polymerizable compound comprises an allyl compound and/or an N-vinyl compound.

(5) The ink composition as described in (4), wherein the content of the allyl compound and/or N-vinyl compound is from 20 to 80% by weight.

(6) The ink composition as described in (4) or (5), wherein the allyl compound is allyl glycol.

(7) The ink composition as described in any one of (4) to (6), wherein the N-vinyl compound is N-vinyl formamide.

(8) A two-pack curing ink composition set comprising an ink composition containing a coloring material and a reaction liquid containing a photopolymerization initiator and capable of forming an image with an ink composition obtained by mixing the ink composition and the reaction liquid, wherein the ink composition after mixing contains at least a polymerizable compound, a photopolymerization initiator and a coloring material, and is free from an aqueous solvent, wherein the polymerizable compound comprises a urethane oligomer.

(9) The two-pack curing ink composition set as described in (8), wherein the ink composition after mixing is the ink composition as described in any one of (1) to (7).

(10) A recording method using the ink composition as described in any one of (1) to (7), or the two-pack curing ink composition set as described in any one of (8) and (9).

(11) Recorded matter obtained using the ink composition as described in any one of (1) to (7), or the two-pack curing ink composition set as described in any one of (8) and (9).

The ink composition of the present invention is an ink composition which contains at least a polymerizable compound, a photopolymerization initiator and a coloring material, and is free from an aqueous solvent, wherein the polymerizable compound comprises at least a urethane oligomer. Owing to these features, an ink composition having excellent film strength and additionally excellent curability and capable of forming a clear image can be provided.

Furthermore, the two-pack curing ink composition set of the present invention is a two-pack curing ink composition set comprising: an ink composition containing a coloring material; and a reaction liquid containing a photopolymerization initiator, and capable of forming an image with an ink composition obtained by mixing the ink composition and the reaction liquid, wherein the ink composition after mixing contains at least a polymerizable compound, a photopolymerization initiator and a coloring material, and is free from an aqueous solvent, wherein the polymerizable compound comprises a urethane oligomer (that is, the constitution of the ink composition according to the present invention described above). Such a two-pack curing ink composition set makes it possible to have excellent film strength and additionally excellent curability and to form a clear image.

DETAILED DESCRIPTION OF THE INVENTION

The ink composition of the present invention is described in detail below.

The ink composition of the present invention is an ink composition which contains at least a polymerizable compound, a photopolymerization initiator and a coloring material, and does not contain an aqueous solvent, wherein at least a urethane oligomer is contained as the polymerizable compound.

The urethane oligomer in the present invention means a urethane oligomer having at least one urethane bond and radically polymerizable unsaturated double bond in the molecule. The term "oligomer" as used in the present invention means a molecule of a medium size having a structure constituted by small number repetitions, generally from about 2 to 20, of units substantially or conceptually obtained from a molecule having a relative molecular mass (synonymous with a molecular weight).

The urethane oligomer in the present invention has at least one acryloyl group as a functional group, and therefore has the properties of inducing a polymerization reaction with a monomer or the like by ultraviolet irradiation or the like, thereby crosslinking and polymerizing.

The urethane oligomer used in the present invention includes a oligomer generated by an addition reaction of a polyol, a polyisocyanate and a polyhydroxy compound, and additionally includes a polyester type urethane acrylate, a polyether type urethane acrylate, a polybutadiene type urethane acrylate and a polyol type urethane acrylate, depending on a molecular structure constituting a skeleton.

The urethane oligomer used in the present invention has a molecular weight in a range of from about 500 to 20,000, and preferably from about 500 to 10,000.

The content of the urethane oligomer in the ink composition according to the present invention is in a range of from about 1 to 50% by weight, and preferably from about 3 to 30% by weight.

The ink composition according to the present invention preferably contains a photopolymerization initiator for radical polymerization or cationic polymerization as a photopolymerization initiator.

The photopolymerization initiator in the present invention is a compound which induces chemical change through action of light or interaction with electron excitation state of a sensitizing dye, thereby generating at least one of radical, acid and base.

The photopolymerization initiator can be used by appropriately selecting from compounds having sensitivity to active light irradiated, such as ultraviolet ray of 400 to 200 nm, far ultraviolet ray, g ray h ray, i ray, KrF excimer laser light, ArF excimer light, electron beam, X ray, molecular beam or ion beam.

Specific photopolymerization initiator can use the conventional initiators known to one skilled in the art, and is specifically described in, for example, Bruce M. Monroe et al., Chemical Revue, 93, 435 (1993); P. S. Davidson, Journal of Photochemistry and Biology A: Chemistry, 73. 81 (1993); J. P. Faussier, "Photoinitiated Polymerization-Theory and Applications": Rapra Review vol. 9, Report, Rapra Technology (1998); and M. Tsunooka et al., Prog. Polym. Sci., 21, 1 (1996). Furthermore, many compounds used in chemical amplification photoresist and photocationic polymerization are described in The Japanese Research Association of Organic Electronics Materials, Imaging Organic Materials, pages 187-192 (1993), Bun-Shin Shuppan. Furthermore, compounds that oxidatively or reductively generate bond cleavage through interaction with electron excitation state of a sensitizing dye, as described in, for example, F. D. Saeva, Topics in Current Chemistry, 156, 59 (1990); G. G. Maslak, Topics in Current Chemistry, 168, 1 (1993); H. B. Shuster et al., JACS, 112, 6329 (1990); and I. D. F. Eaton et al., JACS, 102, 3298 (1980) are known.

Preferable examples of the photopolymerization initiator include (a) aromatic ketones, (b) aromatic onium salt compounds, (c) organic peroxides, (d) hexaaryl biimidazole compounds, (e) ketoxime ester compounds, (f) borate compounds, (g) adinium compounds, (h) metallocene compounds, (i) active ester compounds and (j) compounds having carbon-halogen bond.

Preferable examples of the aromatic ketones (a) include compounds having a benzophenone skeleton or a thioxanthone skeleton, described in "RADIATION CURING IN POLYMER SCIENCE AND TECHNOLOGY", J. P. FOUASSIER, J. F. RABEK (1993), p 77 to 117.

More preferable aromatic ketones (a) include α-thiobenzophenone compounds described in JP-B-47-6416, benzoin ether compounds described in JP-B-47-3981, α-substituted benzoin compounds described in JP-B-47-22326, benzoin derivatives described in JP-B-47-23664, aroylphosphonic esters described in JP-A-57-30704, dialkoxybenzophenones described in JP-B-60-26483, benzoin ethers described in JP-B-60-26403 and JP-A-62-81345, α-aminobenzophenones described in JP-B-1-34242, U.S. Pat. No. 4,318,791 and EP 0284561 A1, p-di(dimethylaminobenzoyl)benzene described in JP-A-2-211452, thiosubstituted aromatic ketones described in JP-A-61-194062, acylphosphine sulfides described in JP-B-2-9597, acylphosphines described in JP-B-2-9596, thioxanthones described in JP-B-63-61950 and coumalins described in JP-B-59-42864.

Examples of the aromatic onium salts (b) include elements of Groups V, VI and VII in the periodic table, specifically aromatic onium salts of N, P, As, Sb, Bi, O, S, Se, Te and I. For example, iodonium salts described in European Patent 104143, U.S. Pat. No. 4,837,124, JP-A-2-150848 and JP-A-2-96514; sulfonium salts described in European Patents 370693, 233567, 297443, 297442, 279210 and 422570, and U.S. Pat. Nos. 3,902,144, 4,933,377, 4,760,013, 4,734,444 and 2,833,827; diazonium salts (such as benzene diazonium which may have a substituent); diazonium salt resins (such as formaldehyde resin of diazodiphenylamine); N-alkoxypyridinium salts (for example, described in U.S. Pat. No. 4,743,528, JP-A-63-138345, JP-A-63-142345, JP-A-63-142346 and JP-B-46-42363, specifically 1-methoxy-4-phenylpyridinium tetrafluoroborate and the like); and compounds described in JP-B-52-147277, 52-14278 and 52-14279 are preferably used.

The organic peroxides (c) include almost all of organic compounds having at least one oxygen-oxygen bond in the molecule, and preferred examples thereof include peroxide ester types such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(t-cumylperoxycarbonyl)benzophenone, 3,3',4,4'-tetra-(t-isopropylcumylperoxycarbonyl)benzo-phenone, and di-t-butylperoxyisophthalate.

Examples of the hexaaryl biimidazole include lophine dimers described in JP-B-45-37377 and JP-B-44-86516 such as 2,2'-bis(o-chlorophenyl)-4,4',5,5'-tetraphenyl biimidazole, 2,2'-bis(o-bromophenyl)-4,4',5,5'-tetraphenyl biimidazole, 2,2'-bis(o,p-dichlorophenyl)-4,4',5,5'-tetraphenyl biimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenyl biimidazole, 2,2'-bis(o-nitrophenyl)-4,4',5,5'-tetraphenyl biimidazole, 2,2'-bis(o-methylphenyl)-4,4',5,5'-tetraphenyl biimidazole, and 2,2'-bis(o-trifluorophenyl)-4,4',5,5'-tetraphenyl biimidazole.

Examples of the ketoxime ester include 3-benzoyloxyiminobutan-2-one, 3-acetoxyiminobutan-2-one, 3-propoinyloxyiminobutan-2-one, 2-acetoxyiminopentan-3-one, 2-acetoxyimino-1-phenylpropan-1-one, 2-benzoyloxyimino-1-phenylpropan-1-one, 3-toluenesulfonyloxyiminobutan-1-one, and 2-ethoxycarbonyloxyimino-1-phenylpropan-1-one.

Examples of the borate salt (f) that is other example of the photopolymerization initiator in the present invention include compounds described in U.S. Pat. Nos. 3,567,453 and 4,343,891, and European Patents 109,772 and 109,773. Examples of the adinium salt compound (g) that is other example of the photopolymerization initiator include compounds having N—O bond described in JP-A-63-138345, JP-A-63-142345, JP-A-63-142346, JP-A-63-143537 and JP-B-46-42363.

Examples of the metallocene compound (h) which is other example of the photopolymerization initiator include titanocene compounds described in JP-A-59-152396, JP-A-61-151197, JP-A-63-41484, JP-A-2-249 and JP-A-2-4705, and iron-arene complexes described in JP-A-1-304453 and JP-A-1-152109.

Specific examples of the titanocene compound include di-cyclopentadienyl-Ti-di-chloride, di-cyclopentadienyl-Ti-bis-phenyl, di-cyclopentadienyl-Ti-bis-2,3,4,5,6-pentafluoropheny-1-yl, di-cyclopentadienyl-Ti-bis-2,3,5,6-tetrafluoropheny-1-yl, di-cyclopentadienyl-Ti-bis-2,4,6-trifluoropheny-1-yl, di-cyclopentadienyl-Ti-2,6-difluoropheny-1-yl, di-cyclopentadienyl-Ti-bis-2,4-difluoropheny-1-yl, di-methylcyclopentadienyl-Ti-bis-2,3,4,5,6-pentafluoro-pheny-1-yl, di-methylcyclopentadienyl-Ti-bis-2,3,5,6-tetrafluoropheny-1-yl, di-methylcyclopentadienyl-Ti-bis-2,4-difluoropheny-1-yl, bis(cyclopentadienyl)-bis(2,6-difluoro-3-(pry-1-yl)phenyl)-titanium, bis(cyclopentadienyl)bis[2,6-difluoro-3-(methyl-sulfone-amide)phenyl]titanium, and bis(cyclopentadienyl)bis[2,6-difluoro-3-(N-butylbiaroyl-amino)phenyl]titanium.

Examples of the active ester compound (i) include nitrobenzyl ester compounds described in European Patents 0290750, 046083, 156153, 271851 and 0388343, U.S. Pat. Nos. 3,901,710 and 4,181,531, JP-A-60-198538 and JP-A-53-133022; iminosulfonate compounds described in European Patents 0199672, 84515, 199672, 044115 and 0101122, U.S. Pat. Nos. 4,618,564, 4,371,605 and 4,431,774, JP-A-64-18143, JP-A-2-245756 and JP-A-4-365048; and compounds described in JP-B-62-6223, JP-B-63-14340 and JP-A-59-174831.

Preferable examples of the compound (j) having carbon-halogen bond include compounds described in Wakabayashi et al., Bull. Chem. Soc. Japan, 42, 2924 (1969), compounds described in British Patent 1,388,492, compounds described in JP-A-53-133428, and compounds described in German Patent 3,337,024.

Further examples include compounds described in F. C. Schaefer et al., J. Org. Chem., 29, 1527 (1964), compounds described in JP-A-62-58241, and compounds described in JP-A-5-281728, and additionally include compounds described in German Patent 2,641,100, compounds described in German Patent 3,333,450, compounds described in German Patent 3,021,590, and compounds described in German Patent 3,021,599.

Photoradical polymerization initiators commercially available in trade names of Vicure 10 and 30 (products of Stauffer Chemical), Irgacure 127, 184, 500, 651, 2959, 907, 369, 379, 754, 1700, 1800, 1850, 819, OXE01, Darocur 1173, TPO, IXT (products of Ciba Specialty Chemicals), Quantacure CTX (a product of Aceto Chemical), Kayacure DETX-S (a product of Nippon Kayaku) and ESCURE KIP150 (a product of Lamberti) can also be used.

The photopolymerization initiator is contained in the ink composition according to the present invention in an amount of preferably from 1 to 20% by weight, and more preferably from 3 to 15% by weight. Use of the photopolymerization initiator in the above range exhibits the effect of holding curability without deterioration of cured film strength.

The polymerizable compound other than the urethane oligomer used in the ink composition according to the present invention is not particularly limited and can use any compound regardless of the species of a monomer, an oligomer and a polymer so long as it is a compound which induces polymerization reaction by giving any energy and cures. In particular, the conventional various polymerizable monomers known as photocationically polymerizable monomers and photoradically polymerizable monomers, that induce polymerization reaction by initiation species generated from a photopolymerization initiator are preferably used.

The polymerizable compound can be used alone or a mixture of two or more thereof for the purpose of adjusting reaction rate, ink properties, cured film properties and the like. Furthermore, the polymerizable compound may be a monofunctional compound or a multifunctional compound.

Examples of the cationically polymerizable compound used as the polymerizable compound in the present invention include epoxy compounds, vinyl ether compounds and oxetane compounds, described in, for example, JP-A-6-9714, 2001-31892, 2001-40068, 2001-55507, 2001-310938, 2001-310937 and 2001-220526.

The epoxy compound includes aromatic epoxides and alicyclic epoxides.

Examples of the monofunctional epoxy compound that can be used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-bitadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide and 3-vinylcyclohexene oxide.

Examples of the multifunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinyl epoxycyclohexane, bis(3,4-epoxy-6-methylcyclohexylmethyl)adipate, 3,4-epoxy-6-methylcyclohexyl-3',4'-epoxy-6'-methylcyclo-hexane carboxylate, methylenebis(3,4-epoxycyclohexane), dicyclopentadiene diepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane and 1,2,5,6-diepoxycyclooctane.

Of those epoxy compounds, the aromatic epoxide and alicyclic epoxide are preferred from the standpoint of excellent curing rate, and the alicyclic epoxide is particularly preferred.

Examples of the monofunctional vinyl ether that can be used in the present invention include methylvinyl ether, ethylvinyl ether, propylvinyl ether, n-butylvinyl ether, t-butylvinyl ether, 2-ethylhexylvinyl ether, n-nonylvinyl ether, laurylvinyl ether, cyclohexylvinyl ether, cyclohexylmethylvinyl ether, 4-methylcyclohexylmethylvinyl ether, benzylvinyl ether, dicyclopentenylvinyl ether, 2-dicyclopentenoxyethylvinyl ether, methoxyethylvinyl ether, ethoxyethylvinyl ether, butoxyethylvinyl ether, methoxyethoxyethylvinyl ether, ethoxyethoxyethylvinyl ether, methoxypolyethylene glycol vinyl ether, tetrahydrofurfurylvinyl ether, 2-hydroxyethylvinyl ether, 2-hydroxypropylvinyl ether, 4-hydroxybutylvinyl ether, 4-hydroxymethylcyclohexylmethylvinyl ether, diethylene glycol monovinyl ether, polyethylene glycol vinyl ether, chloroethylvinyl ether, chlorobutylvinyl ether, chloroethoxyethylvinyl ether, phenylethylvinyl ether and phenoxypolyethylene glycol vinyl ether.

Examples of the multifunctional vinyl ether include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol hexavinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

The vinyl ether compound is preferably a di- or trivinyl ether compound from the standpoints of curability, adhesion to a medium to be recorded, surface hardness of image formed, and the like, and a divinyl ether compound is particularly preferred.

The oxetane compound in the present invention means a compound having an oxetane ring, and the conventional oxetane compounds as described in JP-A-2001-220526, 2001-310937 and 2003-341217 can optionally be selected and used.

The compound having an oxetane ring that can be used in the present invention is preferably a compound having from 1 to 4 oxetane rings in its structure. Use of such a compound makes it easy to maintain a viscosity of an ink composition in a range of good handling properties, and can obtain high adhesion of ink after curing to a medium to be recorded.

Examples of the monofunctional oxetane used in the present invention include 3-ethyl-3-hydroxymethyloxetane, 3-(meth)allyloxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl) ether, 2-ethylhexyl(3-ethyl-3-oxetanylmethyl)ether, ethyl diethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl (3-ethyl-3-oxetanylmethyl)ether, tetrahydrofurfuryl(3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromo(3-ethyl-3-oxetanylmethyl)ether, and bornyl(3-ethyl-3-oxetanylmethyl) ether.

Examples of the multifunctional oxetane include 3,7-bis (3-oxetanyl)-5-oxa-nonane, 3,3'-(1,3-(2-methylenyl)propanediylbis(oxymethylene)bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)-ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)-ether, EO-modified bisphenol A bis(3-ethyl-3-oxetanylmethyl)ether, PO-modified bisphenol A bis (3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, and EO-modified bisphenol F (3-ethyl-3-oxetanylmethyl)ether.

Such compounds having an oxetane ring are described in detail in JP-A-2003-341217, paragraphs 0021 to 0048, and the compounds described therein can suitably be used in the present invention.

Of the oxetane compounds used in the present invention, a compound having 1 to 2 oxetane rings is preferably used from the standpoints of viscosity and adhesion of an ink composition.

In the ink composition of the present invention, those polymerizable compounds may be used alone or as mixtures of two or more thereof, other than the urethane oligomer. From the standpoint of effectively suppressing shrinkage at the time of ink curing, at least one oxetane compound and at least one selected from an epoxy compound and a vinyl ether compound are preferably used together.

It is preferred in the present invention to use conventional various radically polymerizable compounds that induce polymerization reaction by initiation species generated from a photoradical initiator, as the polymerizable compound.

Examples of the radically polymerizable monomer include (meth)acrylates, (meth)acryl amides and aromatic vinyls. In the description, when both or any one of "acrylate" and "methacrylate" are intended, it is described "(meth)acrylate", and when both or any one of "acryl" and "methacryl" are intended, it is described "(meth)acryl".

The (meth)acrylate used in the present invention includes the following compounds.

Examples of the monofunctional (meth)acrylate include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H, 1H, 2H, 2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, hydroxyalkyl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxypropyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxythyl succinic acid, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, EO-modified phenol (meth)acrylate, EO-modified cresol (meth)acrylate, EO-modified nonylphenol (meth)acrylate, PO-modified nonylphenol (meth)acrylate, and EO-modified-2-ethylhexyl (meth)acrylate.

Examples of the bifunctional (meth)acrylate include 1,6-hexanediol di(meth)acrylate, 1,10-decanediol di(meth)acrylate, neopentyl glycol di(meth)acrylate, 2,4-dimethyl-1,5-pentanediol di(meth)acrylate, butyl ethyl propane di(meth)acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth)acrylate, EO-modified bisphenol A di(meth)acrylate, bisphenol F polyethoxy di(meth) acrylate, polypropylene glycol di(meth)acrylate, oligopropylene glycol di(meth)acrylate, 1,4-butanediol di(meth) acrylate, 2-ethyl-2-butylpropanediol di(meth)acrylate, 1,9-nonane di(meth)acrylate, propoxylated ethoxylated bisphenol A di(meth)acrylate, and tricyclodecane di(meth) acrylate.

Examples of the trifunctional (meth)acrylate include trimethylolpropane (meth)acrylate, trimethylolethane (meth) acrylate, alkylene oxide-modified tri(meth)acrylate of trimethylolpropane, pentaerythritol tri(meth)acrylate, dipentaerythritol tri(meth)acrylate, trimethylolpropane tri ((meth)acryloyloxypropane)ether, isocyanuric acid alkylene oxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerin triacrylate.

Examples of the tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Examples of the pentafunctional (meth)acrylate include sorbitol penta(meth)acrylate, and dipentaerythritol penta(meth)acrylate.

Examples of the hexa(meth)acrylate include dipentaerythritol hexa(methacrylate), sorbitol hexa(methacrylate), alkylene oxide-modified hexa(methacrylate) of phosphazene, and caprolacton-modified dipentaerythritol hexa(meth)acrylate.

Examples of the (meth)acrylamides used in the present invention include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloyl morpholine.

Examples of the aromatic vinyls used in the present invention include styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene and 4-t-butoxystyrene.

Examples of the radically polymerizable monomer in the present invention include vinyl esters (vinyl acetate, vinyl propionate, vinyl versatate and the like), allyl esters (allyl acetate and the like), halogen-containing monomers (vinylidene chloride, vinyl chloride and the like), vinyl ethers (methyl vinyl ether, butyl vinyl ether, hexyl vinyl ether, methoxyvinyl ether, 2-ethylhexylvinyl ether, methoxyethylvinyl ether, cyclohexylvinyl ether, chloroethylvinyl ether and the like), vinyl cyanate ((meth)acrylonitrile and the like), and olefins (ethylene, propylene and the like).

Of those, as the radically polymerizable monomers in the present invention, (meth)acrylates and (meth)acrylamides are preferred from the point of curing rate, and tetrafunctional or more (meth)acrylates are particularly preferred from the point of curing rate. Furthermore, it is preferred to use the multifunctional (meth)acrylates in combination with monofunctional or bifunctional (meth)acrylates, and (meth)acrylamide from the standpoint of viscosity of an ink composition.

It is suitable that the content of the polymerizable compound in an ink composition is from 50 to 95% by mass based on the total solid content of the composition. The content is in a range of preferably from 60 to 92% by weight, and more preferably from 70 to 90% by weight.

It is preferred that the monomer used in the present invention has PII value (Primary Irritation Index) of 2 or less.

Monofunctional monomers, bifunctional monomers and multifunctional monomers, having PII value of 2 or less used in the present invention are shown in Table 1 below.

TABLE 1

| Material name | Viscosity (mPa · s) | P.I.I |
|---|---|---|
| Monofunctional monomer | | |
| (2-Methyl-2-ethyl-1,3-dioxolan-4-yl)methyl acrylate (MEDOL-10, Osaka Organic Chemical) | 5.1 | 1.3 |
| (2-Ethyl-2-isobutyl-1,3-dioxolan-4-yl)methyl acrylate (MIBDOL-10, Osaka Organic Chemical) | 5.3 | 1.0 |
| Phenoxyethyl acrylate (VISCOAT #192, Osaka Organic Chemical) | 3.3 | 1.7 |
| Isobornyl acrylate (IBXA, Osaka Organic Chemical) | 2.6 | 0.6 |
| Methoxydiethylene glycol monoacrylate (BLEMMER PME-100, NOF Corporation) | 2 | 0.7 |
| Acryloyl morpholine (ACMO, Kohjin Co.) | 12 | 0.5 |
| Bifunctional monomer | | |
| Ethylene glycol dimethacrylate (LIGHT-ESTER EG, Kyoeisha Chemical Co.) | 3 | 0.6 |
| Diethylene glycol dimethacrylate (LIGHT-ESTER 2EG, Kyoeisha Chemical Co.) | 5 | 0.5 |
| Tripropylene glycol diacrylate (ARONIX M-220, Toagosei Co.) | 12 | 1.6 |
| 1,9-Nonanediol diacrylate (VISCOAT #260, Osaka Organic Chemical) | 21 | 2.0 |
| Polyethylene glycol #400 diacrylate (NK ESTER A400, Shin-Nakamura Chemical) | 58 | 0.4 |
| Tetraethylene glycol dimethacrylate (NK ESTER 4G, Shin-Nakamura Chemical) | 14 | 0.5 |
| 1,6-Hexanediol dimethacrylate (NK ESTER HD-N, Shin-Nakamura Chemical) | 6 | 0.5 |
| Neopentyl glycol dimethacrylate ((NK ESTER NPG, Shin-Nakamura Chemical) | 7 | 0.0 |

TABLE 1-continued

| Material name | Viscosity (mPa · s) | P.I.I |
|---|---|---|
| 2-Hydroxy-1,3-dimethacryloxypropane (NK ESTER 701, Shin-Nakamura Chemical) | 37 | 0.6 |
| 1,4-Butanediol dimethacrylate ((BD, Shin-Nakamura Chemical) | 7 | 2.0 |
| Multifunctional monomer | | |
| Trimethylolpropane trimethacrylate (NK ESTER TMPT, Shin-Nakamura Chemical) | 42 | 0.8 |
| Trimethylolpropane-modified triacrylate (VISCOAT #360, Osaka Organic Chemical) | 55 | 1.5 |
| Trimethylolpropane PO-modified triacrylate (NEW FRONTIER TMP-3P, Dai-Ichi Kogyo Seiyaku) | 60 | 0.1 |
| Glycerin PO-modified triacrylate (VISCOAT #GPT, Osaka Organic Chemical) | 75 | 0.8 |

Viscosity in the above Table is the measurement value at 25° C.

In the present invention, compounds having an allyl group and compounds having an N-vinyl group are preferably used as the polymerizable compound.

The compound having an allyl group as the polymerizable compound in the present invention is the generic name of compounds having a 2-propenyl structure (—CH$_2$CH═CH$_2$). The 2-propenyl group is called an allyl group, and is a common expression in IUPAC nomenclature system.

Examples of the compound having an allyl group include allyl glycol (a product of Nippon Nyukazai Co.); trimethylolpropane diallyl ether, pentaerythritol triallyl ether and glycerin monoallyl ether (products of Daiso Co.); and polyoxyalkylene compounds having an allyl group as trade names of UNIOX, UNIROOVE, POLYCERIN and UNISAFE (products of NOF Corporation).

In the present invention, examples of the compound having an N-vinyl group include N-vinyl formamide, N-vinyl carbazole, N-vinyl acetamide, N-vinyl pyrrolidone, N-vinyl caprolactam and their derivatives. N-vinyl formamide is particularly preferred.

Where the addition amount of the allyl group-containing compound and/or N-vinyl formamide is less than 20% by weight, there are problems on viscosity, dispersion stability, storage stability and the like of an ink composition. Where the addition amount exceeds 80% by weight, curability and film strength as an ink composition may be insufficient. Therefore, the addition amount is preferably from 20 to 80% by weight, and more preferably from 20 to 70% by weight.

The ink composition of the present invention may contain a polymerization accelerator.

The polymerization accelerator is not particularly limited, and examples thereof include Darocur EHA and EDB (products of Ciba Specialty Chemicals).

When the polymerizable compound is a radically polymerizable compound, the ink composition of the present invention preferably contains a heat radical polymerization inhibitor. Use of the inhibitor improves storage stability of the ink composition. The heat radical polymerization inhibitor includes Irgastab UV-10 (a product of Ciba Specialty Chemicals).

The ink composition of the present invention can use a surfactant. For example, as a silicone surfactant, it is preferred to use a polyester-modified silicone and a polyether-modified silicone, and it is particularly preferred to use a polyether-modified polydimethylsiloxane or a polyester-modified polydimethylsiloxane. Specific examples thereof include BYK- 347, BYK-348, and BYK-UV3500, 3510, 3530 and 3570 (products of BYK-Chemie Japan)

The ink composition of the present invention contains a coloring material.

The coloring material used may be either of dyes and pigments, but use of pigments is advantageous from the point of durability of printed matters.

The dyes used in the present invention can use various dyes generally used in ink jet recording, such as direct dyes, acid dyes, edible dyes, basic dyes, reactive dyes, disperse dyes, vat dyes, soluble vat dyes and reaction disperse dyes.

The pigments used in the present invention can use inorganic pigments and organic pigments without particular limitation.

The inorganic pigment can use titanium oxide and iron oxide, and additionally can use carbon black produced by the conventional methods such as contact method, furnace method and thermal method. The organic pigment that can be used includes azo pigments (including azo lake, insoluble azo pigment, condensed azo pigment, chelate azo pigment and the like), polycyclic pigments (for example, phthalocyanine pigment, perylene pigment, perylone pigment, anthraquinone pigment, quinacridone pigment, dioxazine pigment, thioindigo pigment, isoindolinone pigment and quinofuralone pigment), dye chelates (for example, basic dye chelate and acidic dye chelate), nitro pigments, nitroso pigments and aniline black.

As the specific examples of the pigments, examples of carbon black include C. I. pigment black 7; No. 2300, No. 900, MCF88, No. 33, No. 40, No. 45, No. 52, MA7, MA8, MA100 and No. 2200, products of Mitsubishi Chemical Corporation; Raven 5750, 5250, 5000, 3500, 1255 and 700, products of Colombian Chemicals; Regal 400R, 330R and 660R, Mogul L and 700, and Monarch 800, 880, 900, 1000, 1100, 1300 and 1400, products of Cabot Corporation; and Color Black FW1, FW2, FW2V, FW18 and FW200, Color Black S150, S160 and 5170, Printex 35, U, V and 140U, and Special Black 6, 5, 4A and 4, products of Tegussa Co.

Examples of the pigment used in a yellow ink include C. I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185 and 213.

Examples of the pigment used in a magenta ink include C. I. Pigment Red 5, 7, 12, 48(Ca), 48(Mn), 57(Ca), 57:1, 112, 122, 123, 168, 184, 202 and 209, and Pigment Violet 19.

Examples of the pigment used in a cyan ink include C. I. Pigment Blue 1, 2, 3, 15:3, 15:4, 60, 16 and 22.

According to the preferred embodiment of the present invention, the pigment has an average particle diameter in a range of preferably from 10 to 200 nm, and more preferably from about 50 to 150 nm. The addition amount of the coloring material in the ink composition is in a range of preferably from 0.1 to 25% by mass, and more preferably from about 0.5 to 15% by mass.

According to the preferred embodiment of the present invention, those pigments are dispersed in a monomer medium with a dispersing agent or a surfactant to obtain a pigment dispersion, which may be used as an ink composition. Dispersing agents commonly used to prepare a pigment dispersion, for example, a polymer dispersing agent, can be used as the preferred dispersing agent.

Where the ink composition contains a coloring material, the ink composition containing the coloring material may comprise plural ink compositions of respective colors. For example, where in addition to four fundamental colors of yellow, magenta, cyan and black, dark color and/or light color of the same color series are to be added for the respective color, examples thereof include light magenta (light color) and red (dark color) for magenta, light cyan (light color) and blue (dark color) for cyan, and gray and light black (light colors) and mat black (dark color) for black.

Wetting agents, penetrating agents, pH regulators, preservatives, mildewcides and the like may be added to the ink composition of the present invention as conventional other components that can be used in an ink.

Besides, leveling additives, matte agents, and polyester resins, polyurethane resins, vinyl resins, acrylic resins, rubber resins and waxes for adjusting film properties can be added according to need.

When the ink composition of the present invention is used in an ink jet recording method, it is preferred in use that the ink composition has viscosity of 10 mPa·s or less at 25° C.

When the ink composition of the present invention is a light curing ink composition, curing reaction is conducted by light irradiation. When the ink composition of the present invention is an ultraviolet curing ink composition, the ink composition is discharged on a recording medium, and is then irradiated with ultraviolet rays.

When the two-pack curing ink composition set of the present invention is a light curing ink composition set, curing reaction is conducted by mixing an ink composition containing a coloring material and a reaction liquid containing a photopolymerization initiator, and then irradiating with light (preferably ultraviolet rays). Mixing may be conducted before or after printing so long as it is before curing reaction. Specifically, the mixing and printing may have the embodiment that the ink composition containing a coloring material and the reaction liquid containing a photopolymerization initiator are deposited on a recording medium at the same position, or may have the embodiment that the ink composition containing a coloring material and the reaction liquid containing a photopolymerization initiator are mixed, and then deposited on a recording medium.

The two-pack curing ink composition set of the present invention does not have any particular limitation on the formation of the ink composition containing a coloring material and the reaction liquid containing a photopolymerization initiator so long as, in the state of mixing the ink composition containing a coloring material and the reaction liquid containing a photopolymerization initiator, such a mixture is the ink composition according to the present invention as described above (that is, an ink composition that contains at least a polymerizable compound, a photopolymerization initiator and a coloring material, and that does not contain an aqueous solvent, wherein at least a urethane oligomer is contained as the polymerizable compound).

Irradiation light source is not particularly limited, but the irradiation light source is preferably light having a wavelength of from 350 to 450 nm.

Irradiation amount of ultraviolet rays is in a range of from 10 to 20,000 mJ/cm$^2$, and preferably from 50 to 15,000 mJ/cm$^2$. Ultraviolet irradiation amount in a range of such a degree enables curing reaction to sufficiently conduct.

Ultraviolet irradiation is conducted with lamps, and examples of the lamp include metal halide lamp, xenon lamp, carbon arc lamp, chemical lamp, low pressure mercury lamp and high pressure mercury lamp. For example, commercially available lamps such as H lamp, D lamp and V lamp, products of Fusion System, can be used.

Furthermore, ultraviolet irradiation can be conducted with ultraviolet light-emitting semiconductor elements such as ultraviolet light-emitting diode (ultraviolet LED) and ultraviolet light-emitting semiconductor laser.

The recording method of the ink composition and two-pack curing composition set according to the present invention are suitably used in ink jet, UV flexo printing, UV gravure printing and the like, and can form a clear image having excellent film strength and additionally excellent curability.

EXAMPLES

The present invention will be illustrated in greater detail by reference to the following Examples, but the invention should not be construed as being limited thereto.

Examples 1 to 12 and Comparative Examples 1 to 8

(Preparation of Pigment Dispersion)

In the Examples and Comparative Examples, the pigment dispersion was prepared by the following method.

Allyl glycol (a product of Nippon Nyukazai Co.) as a monomer was added to 15% by weight of C. I. Pigment Black 7 (carbon black) as a coloring material and 3.5% by weight of DISCOL N-509 (a product of Dainichiseika Color & Chemicals Mfg. Co.) to make the whole 100% by weight, followed by mixing and stirring to obtain a mixture. This mixture was subjected to dispersion treatment together with zirconia beads (diameter 1.5 mm) for 6 hours using a sand mill (a product of Yasukawa Seisakusho).

Thereafter, zirconia beads were separated with a separator to obtain a black pigment dispersion.

Pigment dispersions corresponding to the respective colors, specifically cyan pigment dispersion 4 (C. I. Pigment Blue 15:3), magenta pigment dispersion (C. I. Pigment Violet 19) and yellow pigment dispersion (C. I. Pigment Yellow 155), were prepared in the same manner as above.

(Preparation of Ink Composition)

In the Examples and the Comparative Examples, a polymerizable compound, a photoradical polymerization initiator and a dispersing agent were mixed and completely dissolved to prepare an ink composition. The above-described pigment dispersion was gradually added dropwise to an ink solvent of the ink composition while stirring the pigment dispersion. After completion of the dropwise addition, the resulting mixture was mixed and stirred at ordinary temperature for 1 hour to obtain an ink composition. The respective ink composition was filtered with a membrane filter of 5 μm to obtain the desired ink composition. Ink compositions of the Examples (Examples 1 to 12) and the Comparative Examples (Comparative Examples 1 to 8) are shown in Tables 2 to 6 (the numerical values in the Tables are "% by weight").

TABLE 2

|  | Example 1 | Example 2 | Example 3 | Example 4 |
|---|---|---|---|---|
| Allyl glycol | 74.3 | 74.3 | 74.1 | 74.1 |
| N-vinylformamide |  |  |  |  |
| Urethane oligomer (U-15HA, a product of Shin-Nakamura Chemical) | 17 | 17 | 17 | 17 |
| Irgacure 819 | 4 | 4 | 4 | 4 |
| Irgacure 127 | 1 | 1 | 1 | 1 |
| Pigment Black 7 | 3 |  |  |  |
| Pigment Blue 15:3 |  | 3 |  |  |
| Pigment Violet 19 |  |  | 3 |  |
| Pigment Yellow 155 |  |  |  | 3 |
| Dispersing agent | 0.7 | 0.7 | 0.9 | 0.6 |

TABLE 3

|  | Example 5 | Example 6 | Example 7 | Example 8 |
|---|---|---|---|---|
| Allyl glycol | 49.3 | 49.3 | 49.1 | 49.4 |
| N-vinylformamide | 25 | 25 | 25 | 25 |
| Urethane oligomer (U-15HA, a product of Shin-Nakamura Chemical) | 17 | 17 | 17 | 17 |
| Irgacure 819 | 4 | 4 | 4 | 4 |
| Irgacure 127 | 1 | 1 | 1 | 1 |
| Pigment Black 7 | 3 |  |  |  |
| Pigment Blue 15:3 |  | 3 |  |  |
| Pigment Violet 19 |  |  | 3 |  |
| Pigment Yellow 155 |  |  |  | 3 |
| Dispersing agent | 0.7 | 0.7 | 0.9 | 0.6 |

TABLE 4

|  | Comparative Example 1 | Comparative Example 2 | Comparative Example 3 | Comparative Example 4 |
|---|---|---|---|---|
| Allyl glycol | 66.3 | 66.3 | 66.1 | 66.4 |
| N-vinylformamide | 25 | 25 | 25 | 25 |
| Irgacure 819 | 4 | 4 | 4 | 4 |
| Irgacure 127 | 1 | 1 | 1 | 1 |
| Pigment Black 7 | 3 |  |  |  |
| Pigment Blue 15:3 |  | 3 |  |  |
| Pigment Violet 19 |  |  | 3 |  |
| Pigment Yellow 155 |  |  |  | 3 |
| Dispersing agent | 0.7 | 0.7 | 0.9 | 0.6 |

TABLE 5

|  | Comparative Example 5 | Comparative Example 6 | Comparative Example 7 | Comparative Example 8 |
|---|---|---|---|---|
| Allyl glycol | 64.3 | 64.3 | 64.1 | 64.4 |
| Urethane oligomer (U-15HA, a product of Shin-Nakamura Chemical) | 17 | 17 | 17 | 17 |
| Irgacure 819 | 4 | 4 | 4 | 4 |
| Irgacure 127 | 1 | 1 | 1 | 1 |
| Pigment Black 7 | 3 |  |  |  |
| Pigment Blue 15:3 |  | 3 |  |  |
| Pigment Violet 19 |  |  | 3 |  |
| Pigment Yellow 155 |  |  |  | 3 |
| Dispersing agent | 0.7 | 0.7 | 0.9 | 0.6 |
| Water | 10 | 10 | 10 | 10 |

TABLE 6

|  | Example 9 | Example 10 | Example 11 | Example 12 |
|---|---|---|---|---|
| Trimethylolpropane diallyl ether | 76.3 | 76.3 | 76.1 | 76.4 |
| Urethane oligomer (U-15HA, a product of Shin-Nakamura Chemical) | 15 | 15 | 15 | 15 |
| Irgacure 819 | 4 | 4 | 4 | 4 |
| Irgacure 127 | 1 | 1 | 1 | 1 |
| Pigment Black 7 | 3 |  |  |  |
| Pigment Blue 15:3 |  | 3 |  |  |
| Pigment Violet 19 |  |  | 3 |  |
| Pigment Yellow 155 |  |  |  | 3 |
| Dispersing agent | 0.7 | 0.7 | 0.9 | 0.6 |

(Film Characteristic Test)

The above ink composition was put in drops on a glass substrate, and irradiated with ultraviolet rays having a wavelength of 365 nm under the conditions such that irradiation intensity is 17 mW/cm$^2$, irradiation time is 6 seconds and cumulative light amount is 102 mJ/cm$^2$ to cure the ink composition. The ink composition of the Comparative Examples was put in drops as it is on a glass substrate, and subjected to the ultraviolet irradiation and curing treatment.

Visual evaluation of surface state and the like was conducted by the following indexes.

A: Scratches are not formed with nail scrubbing.

B: Curing is not sufficient, and film is peeled with nail scrubbing.

(Bleeding Characteristic Evaluation)

In the above visual evaluation, bleeding characteristic evaluation was conducted on the ink compositions of the Examples and the Comparative Examples by the following indexes.

A: Edge portion is sharply cured.

B: Bleeding out is generated, and edge portion is jagged.

TABLE 7

|  | Example 1 | Example 2 | Example 3 | Example 4 |
|---|---|---|---|---|
| Film characteristic evaluation | A | A | A | A |
| Bleeding characteristic evaluation | A | A | A | A |

TABLE 8

|  | Example 5 | Example 6 | Example 7 | Example 8 |
|---|---|---|---|---|
| Film characteristic evaluation | A | A | A | A |
| Bleeding characteristic evaluation | A | A | A | A |

TABLE 9

|  | Comparative Example 1 | Comparative Example 2 | Comparative Example 3 | Comparative Example 4 |
|---|---|---|---|---|
| Film characteristic evaluation | B | B | B | B |
| Bleeding characteristic evaluation | A | A | A | A |

TABLE 10

|  | Comparative Example 5 | Comparative Example 6 | Comparative Example 7 | Comparative Example 8 |
|---|---|---|---|---|
| Film characteristic evaluation | B | B | B | B |
| Bleeding characteristic evaluation | B | B | B | B |

TABLE 11

|  | Example 9 | Example 10 | Example 11 | Example 12 |
|---|---|---|---|---|
| Film characteristic evaluation | A | A | A | A |
| Bleeding characteristic evaluation | A | A | A | A |

As is apparent from Tables 7 to 11, each ink composition of each Example according to the present invention obtains the satisfactory results in the film characteristic evaluation and the bleeding characteristic evaluation, and can sufficiently be used as an ink composition having excellent film strength and additionally excellent curability.

Examples 13 to 16

(Preparation of Pigment Dispersion)

In the Examples and the Comparative Examples, the pigment dispersion was prepared by the following method.

Allyl glycol (a product of Nippon Nyukazai Co.) as a monomer was added to 15% by weight of C. I. Pigment Black 7 (carbon black) as a coloring material and 3.5% by weight of Discol N-509 (a product of Dainichiseika Color & Chemicals Mfg. Co.) to make the whole 100% by weight, followed by mixing and stirring to obtain a mixture. This mixture was subjected to dispersion treatment together with zirconia beads (diameter 1.5 mm) for 6 hours using a sand mill (a product of Yasukawa Seisakusho).

Thereafter, zirconia beads were separated with a separator to obtain a black pigment dispersion.

Pigment dispersions corresponding to the respective colors, specifically cyan pigment dispersion 4 (C. I. Pigment Blue 15:3), magenta pigment dispersion (C. I. Pigment Violet 19) and yellow pigment dispersion (C. I. Pigment Yellow 155), were prepared in the same manner as above.

(Preparation of Two-Pack Light Curing Ink Composition Set)

[Preparation of Reaction Liquid A1-4]

Allyl glycol, tripropylene glycol diacrylate and a photoradical polymerization initiator (Irgacure 819 and 127) were mixed in the formulation (wt %) shown in Table 12 below to completely dissolving those. The resulting mixture was filtered with a membrane filter of 5 μm to obtain reaction liquid A1-4.

[Preparation of Ink Composition B1-4]

Allyl glycol, a urethane oligomer and a dispersing agent were mixed in the formulation (wt %) shown in Table 12 below to completely dissolving those. The above-prepared pigment dispersion (Pigment Black 7, Pigment Blue 15:3, Pigment Violet 19 and Pigment Yellow 155) was added dropwise to the mixture obtained above while stirring (the addition amounts are shown in Table 12 below). After completion of the dropwise addition, the resulting mixture was mixed and stirred at ordinary temperature for 1 hour. The mixture was then filtered with a membrane filter of 5 μm to obtain ink composition B1-4.

Two-pack light curing ink composition sets of Examples 13 to 16 are shown in Table 12.

(Film Characteristic Test)

The reaction liquid (kind A) and the ink composition (kind B) as the two-pack curing ink composition set prepared above were put in drops on a glass substrate and then mixed, and the resulting mixture was irradiated with ultraviolet rays having a wavelength of 365 nm under the conditions such that irradiation intensity is 17 mW/cm$^2$, irradiation time is 6 seconds and cumulative light amount is 102 mJ/cm² to cure the mixed ink composition. Visual evaluation of surface state and the like was conducted in the same manner as in Example 1. The results are shown in Table 13.

TABLE 12

|  | Example 13 | | Example 14 | | Example 15 | | Example 16 | |
| --- | --- | --- | --- | --- | --- | --- | --- | --- |
|  | A1 | B1 | A2 | B2 | A3 | B3 | A4 | B4 |
| Allyl glycol | 70 | 79.3 | 70 | 79.3 | 70 | 79.1 | 70 | 79.4 |
| N-vinylformamide | 25 | | 25 | | 25 | | 25 | |
| Urethane oligomer (U-15HA, a product of Shin-Nakamura Chemical) | | 17 | | 17 | | 17 | | 17 |
| Irgacure 819 | 4 | | 4 | | 4 | | 4 | |
| Irgacure 127 | 1 | | 1 | | 1 | | 1 | |
| Pigment Black 7 | | 3 | | | | | | |
| Pigment Blue 15:3 | | | | 3 | | | | |
| Pigment Violet 19 | | | | | | 3 | | |
| Pigment Yellow 155 | | | | | | | | 3 |
| Dispersing agent | | 0.7 | | 0.7 | | 0.9 | | 0.6 |

TABLE 13

|  | Example 13 | Example 14 | Example 15 | Example 16 |
| --- | --- | --- | --- | --- |
| Film characteristic evaluation | A | A | A | A |
| Bleeding characteristic evaluation | A | A | A | A |

As is apparent from Table 13, according to the two-pack light curing ink composition set according to the present invention, it became possible to form a clear image having excellent film strength and additionally excellent curability.

While the present invention has been described in detail and with reference to specific embodiments thereof, it will be apparent to one skilled in the art that various changes and modifications can be made therein without departing from the spirit and scope thereof.

What is claimed is:

1. An ink jet recording method, comprising discharging an ultraviolet curing ink jet ink composition on a recording medium, and then performing a curing reaction of the ultraviolet curing ink jet ink composition by irradiation of light having a wavelength of from 350 to 450 nm at an irradiation amount of 50 to 15,000 mJ/cm² with an ultraviolet light-emitting diode,
wherein the ultraviolet curing ink jet ink composition contains 3 to 30% by weight of an urethane oligomer, 50 to 95% by weight of a polymerizable compound other than the urethane oligomer as a polymerizable monomer, and 1 to 20% by weight of a photopolymerization initiator comprising an acylphosphineoxide; and the ultraviolet curing ink jet ink composition is free from an aqueous solvent, and
wherein the polymerizable compound comprises an allyl compound and/or an N-vinyl compound, and the content of the allyl compound and/or the N-vinyl compound in the ultraviolet curing ink jet ink composition is from 20 to 80% by weight.

2. Recorded matter obtained using the ink jet recording method as claimed in claim 1.

3. The ink jet recording method as claimed in claim 1, wherein the ultraviolet curing ink jet ink composition has a viscosity of 10 mPa·s or less at 25° C.

4. The ink jet recording method as claimed in claim 1, wherein the photopolymerization initiator comprises at least one selected from the group consisting of bis(2,4,6-trimethylbenzoyl)-phenylphosphineoxide and 2-hydroxy-1-{4-[4-(2-hydroxy-2-methyl-propionyl)-benzyl]-phenyl}-2-methyl-propan-1-one.

5. The ink jet recording method as claimed in claim 1, wherein the polymerizable compound comprises a multifunctional (meth)acrylate and a monofunctional or bifunctional (meth)acrylate or (meth)acrylamide.

6. The ink jet recording method as claimed in claim 1, wherein the N-vinyl compound is N-vinyl formamide.

7. The ink jet recording method as claimed in claim 1, wherein the photopolymerization initiator comprises bis(2,4,6-trimethylbenzoyl)-phenylphosphineoxide.

8. The ink jet recording method as claimed in claim 1, wherein the polymerizable compound includes a polymerizable compound having PII value of 2 or less.

9. The ink jet recording method as claimed in claim 1, wherein the urethane oligomer has a molecular weight in a range of from 500 to 10,000.

10. An ink jet recording method, comprising discharging an ultraviolet curing ink jet ink composition on a recording medium, and then performing a curing reaction of the ultraviolet curing ink jet ink composition by irradiation of light having a wavelength of from 350 to 450 nm at an irradiation amount of 50 to 15,000 mJ/cm² with an ultraviolet light-emitting diode,
wherein the ultraviolet curing ink jet ink composition contains at least 3 to 30% by weight of an urethane oligomer, 50 to 95% by weight of a polymerizable compound other than the urethane oligomer as a polymerizable monomer, and 1 to 20% by weight of a photopolymerization initiator comprising an acylphosphineoxide; and the ultraviolet curing ink jet ink composition is free from an aqueous solvent, and
wherein the polymerizable compound comprises N-vinyl formamide.

11. Recorded matter obtained using the ink jet recording method as claimed in claim 10.

12. The ink jet recording method as claimed in claim 10, wherein the ultraviolet curing ink jet ink composition has a viscosity of 10 mPa·s or less at 25° C.

13. The ink jet recording method as claimed in claim 10, wherein the photopolymerization initiator comprises at least one selected from the group consisting of bis(2,4,6-trimethylbenzoyl)-phenylphosphineoxide and 2-hydroxy-1-{4-[4-(2-hydroxy-2-methyl-propionyl)-benzyl]-phenyl}-2-methyl-propan-1-one.

14. The ink jet recording method as claimed in claim 10, wherein the polymerizable compound comprises a multifunctional (meth)acrylate and a monofunctional or bifunctional (meth)acrylate or (meth)acrylamide.

15. The ink jet recording method as claimed in claim 10, wherein the photopolymerization initiator comprises bis(2,4,6-trimethylbenzoyl)-phenylphosphineoxide.

16. The ink jet recording method as claimed in claim 10, wherein the polymerizable compound includes a polymerizable compound having PII value of 2 or less.

17. The ink jet recording method as claimed in claim 10, wherein the urethane oligomer has a molecular weight in a range of from 500 to 10,000.

* * * * *